US012300414B2

(12) United States Patent
Igarashi et al.

(10) Patent No.: US 12,300,414 B2
(45) Date of Patent: May 13, 2025

(54) COIL COMPONENT

(71) Applicant: Murata Manufacturing Co., Ltd., Kyoto-fu (JP)

(72) Inventors: Akio Igarashi, Nagaokakyo (JP); Yuuji Igarashi, Nagaokakyo (JP); Takao Miyamoto, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 1307 days.

(21) Appl. No.: 16/536,469

(22) Filed: Aug. 9, 2019

(65) Prior Publication Data

US 2020/0066435 A1 Feb. 27, 2020

(30) Foreign Application Priority Data

Aug. 25, 2018 (JP) ................................ 2018-157883

(51) Int. Cl.

*H01F 27/29* (2006.01)
*H01F 27/24* (2006.01)
*H01F 27/28* (2006.01)

(52) U.S. Cl.

CPC ......... *H01F 27/24* (2013.01); *H01F 27/2823* (2013.01); *H01F 27/29* (2013.01)

(58) Field of Classification Search

CPC ...... H01F 27/24; H01F 27/2823; H01F 27/29; H01F 27/255; H01F 27/263; H01F 2017/0093; H01F 27/2828; H01F 27/292; H01F 17/045

See application file for complete search history.

(56) References Cited

U.S. PATENT DOCUMENTS

| | | | | |
|---|---|---|---|---|
| 10,600,559 | B2 | 3/2020 | Igarashi et al. | |
| 2013/0027161 | A1* | 1/2013 | Urano | H01F 17/04 336/83 |
| 2015/0042436 | A1* | 2/2015 | Arimitsu | H01F 17/045 336/192 |
| 2018/0130597 | A1* | 5/2018 | Komaya | H01F 17/045 |

FOREIGN PATENT DOCUMENTS

| | | | |
|---|---|---|---|
| CN | 103730229 | A | 4/2014 |
| DE | 10 2017 207 019 | A1 | 11/2017 |
| JP | H11-8133 | A | 1/1999 |
| JP | 2015-035473 | A | 2/2015 |

(Continued)

OTHER PUBLICATIONS

An Office Action; "Notice of Reasons for Refusal," mailed by the Japanese Patent Office on May 11, 2021, which corresponds to Japanese Patent Application No. 2018-157883 and is related to U.S. Appl. No. 16/536,469 with English language translation.

(Continued)

*Primary Examiner* — Mang Tin Bik Lian

(74) *Attorney, Agent, or Firm* — Studebaker Brackett PLLC

(57) ABSTRACT

A coil component includes a drum-shaped core that includes a flange portion, a metal terminal that is mounted on the flange portion and that is formed from a metal plate, and an adhesive layer that contacts both a rising portion of the metal terminal and a rising surface of the flange portion. The adhesive layer includes a thick-walled portion and a thin-walled portion having different thicknesses.

10 Claims, 6 Drawing Sheets

(56) References Cited

FOREIGN PATENT DOCUMENTS

| | | | | | |
|---|---|---|---|---|---|
| JP | 2016-149499 | A | | 8/2016 | |
| JP | 6049956 | B1 | * | 12/2016 | ............... A61B 1/00 |
| JP | 2017-199840 | A | | 11/2017 | |
| WO | WO-2016136018 | A1 | * | 9/2016 | ............... A61B 1/00 |

OTHER PUBLICATIONS

An Office Action mailed by China National Intellectual Property Administration on Feb. 25, 2022, which corresponds to Chinese Patent Application No. 201910665489.7 and is related to U.S. Appl. No. 16/536,469 with English language translation.

* cited by examiner

COIL COMPONENT

CROSS-REFERENCE TO RELATED APPLICATION

This application claims benefit of priority to Japanese Patent Application No. 2018-157883, filed Aug. 25, 2018, the entire content of which is incorporated herein by reference.

BACKGROUND

Technical Field

The present disclosure relates to a coil component, and, particularly, relates to a coil component having a structure in which a metal terminal that is formed from a metal plate is mounted on a drum-shaped core.

Background Art

Japanese Unexamined Patent Application Publication No. 2015-35473 describes a coil component having a structure in which a plurality of metal terminals formed from metal plates are mounted on a drum-shaped core. FIG. 11 is cited from Japanese Unexamined Patent Application Publication No. 2015-35473, and corresponds to FIG. 1 in Japanese Unexamined Patent Application Publication No. 2015-35473. FIG. 11 is an external perspective view of a coil component 61.

The coil component 61 constitutes a common-mode choke coil, and includes, for example, a drum-shaped core 62 made of a ferrite, and a first wire 63 and a second wire 64. The drum-shaped core 62 includes a winding core section (hidden under the wires 63 and 64 and is not shown) on whose peripheral surface the wires 63 and 64 are wound, and a pair of flange portions, that is, a first flange portion 65 and a second flange portion 66, that are provided on a corresponding one of opposite end portions of the winding core section.

Two metal terminals, that is, a first metal terminal 67 and a third metal terminal 69, that are formed from metal plates are mounted on the first flange portion 65. Two metal terminals, that is, a second metal terminal 68 and a fourth metal terminal 70, that are formed from metal plates are mounted on the second flange portion 66. The metal terminal 70 is hidden by the second flange portion 66 and is not shown.

A first end of the first wire 63 is connected to the first metal terminal 67 provided on the first flange portion 65, and a second end of the first wire 63 opposite to the first end of the first wire 63 is connected to the second metal terminal 68 provided on the second flange portion 66. A first end of the second wire 64 is connected to the third metal terminal 69 provided on the first flange portion 65, and a second end of the second wire 64 opposite to the first end of the second wire 64 is connected to the fourth metal terminal 70 (not shown) provided on the second flange portion 66.

In what state each of the metal terminals 67 to 70 is mounted on a corresponding one of the flange portions 65 and 66 is now described.

The flange portions 65 and 66 each include a bottom surface 71 that faces a mounting board when the flange portion 65 or 66 is mounted, an inner end surface 72 that faces the winding core section and that positions a corresponding end portion of the winding core section, and an outer end surface 73 that faces outward on a side opposite to the corresponding inner end surface 72.

The metal terminals 67 to 70 each include a seat portion 74 on a side of the bottom surface 71 of a corresponding one of the flange portions 65 and 66, and a rising portion 76 that extends from the seat portion 74 via a bent portion 75, which covers an edge-line portion where the bottom surface 71 and the outer end surface 73 intersect each other, to a side of the outer end surface 73 of a corresponding one of the flange portions 65 and 66.

In order to fix each of the metal terminals 67 to 70 to a corresponding one of the flange portions 65 and 66, an adhesive is used. The adhesive is applied to portions where the rising portions 76 of the metal terminals 67 and 69 and the outer end surface 73 of the flange portion 65 face each other and to portions where the rising portions 76 of the metal terminals 68 and 70 and the outer end surface 73 of the flange portion 66 face each other.

SUMMARY

In the structure described in Japanese Unexamined Patent Application Publication No. 2015-35473, ordinarily, with the rising portions 76 kept in a pushed state towards the corresponding outer end surfaces 73, the adhesive is solidified. By solidifying the adhesive, the adhesive forms thin adhesive layers having a uniform thickness to realize a firmly adhered state.

However, the inventors of the present application have found that when the coil component 61 having the structure in which the plurality of metal terminals 67 to 70, formed from metal plates, are mounted on the drum-shaped core 62 with an adhesive as described above is in a soldered state with respect to a printed circuit board and is subjected to thermal shock, adhered portions where the metal terminals 67 to 70 and the drum-shaped core 62 are adhered to each other peel.

This is because the differences between the expansion amount and the contraction amount of the printed circuit board during a heat cycle and the expansion amount and the contraction amount of the drum-shaped core 62, made of a ferrite, during the heat cycle are relatively large. That is, when subjected to the heat cycle, the drum-shaped core 62, made of a ferrite, does not expand and contract much, whereas the printed circuit board expands and contracts by a larger amount than the drum-shaped core 62. In addition, the metal terminals 67 to 70 follow the behavior of the printed circuit board. As a result, the adhesive layers that adhere the metal terminals 67 to 70 to the drum-shaped core 62 crack, and the crack causes the adhered portions to peel.

Accordingly, the present disclosure provides a coil component in which an adhered portion where a metal terminal and a drum-shaped core are adhered to each other does not easily peel even for a heat cycle to which the coil component in a soldered state with respect to a printed circuit board is subjected.

According to one embodiment of the present disclosure, a coil component includes a drum-shaped core that includes a winding core section that extends in an axial direction, and a flange portion that is provided on an end portion in the axial direction; a wire that is wound around the winding core section; and a metal terminal that is electrically connected to an end portion of the wire, that is mounted on the flange portion, and that is formed from a metal plate.

The flange portion includes a bottom surface that is parallel to the axial direction and that faces a mounting board when the flange portion is mounted, and a rising surface that rises from the bottom surface. The metal terminal includes a seat portion that covers the bottom surface of the corresponding flange portion, and a rising portion that covers the rising surface of the corresponding flange portion.

The coil component further includes an adhesive layer that contacts both the rising portion and the rising surface. The adhesive layer includes a thick-walled portion and a thin-walled portion having different thicknesses.

According to the above-described embodiment, since the adhesive layer includes a thick-walled portion and a thin-walled portion having different thicknesses, stress exerted upon the thick-walled portion of the adhesive layer can be dispersed and reduced, whereas the adhesion strength at the thin-walled portion can be increased.

Therefore, according to the coil component, it is possible to make it less likely for an adhered portion where the metal terminal and the drum-shaped core are adhered to each other to peel even for a heat cycle to which the coil component in a soldered state with respect to a printed circuit board is subjected, while realizing a high adhesion strength between the metal terminal and the drum-shaped core.

Other features, elements, characteristics and advantages of the present disclosure will become more apparent from the following detailed description of the present disclosure with reference to the attached drawings.

DETAILED DESCRIPTION

Figure 1A:
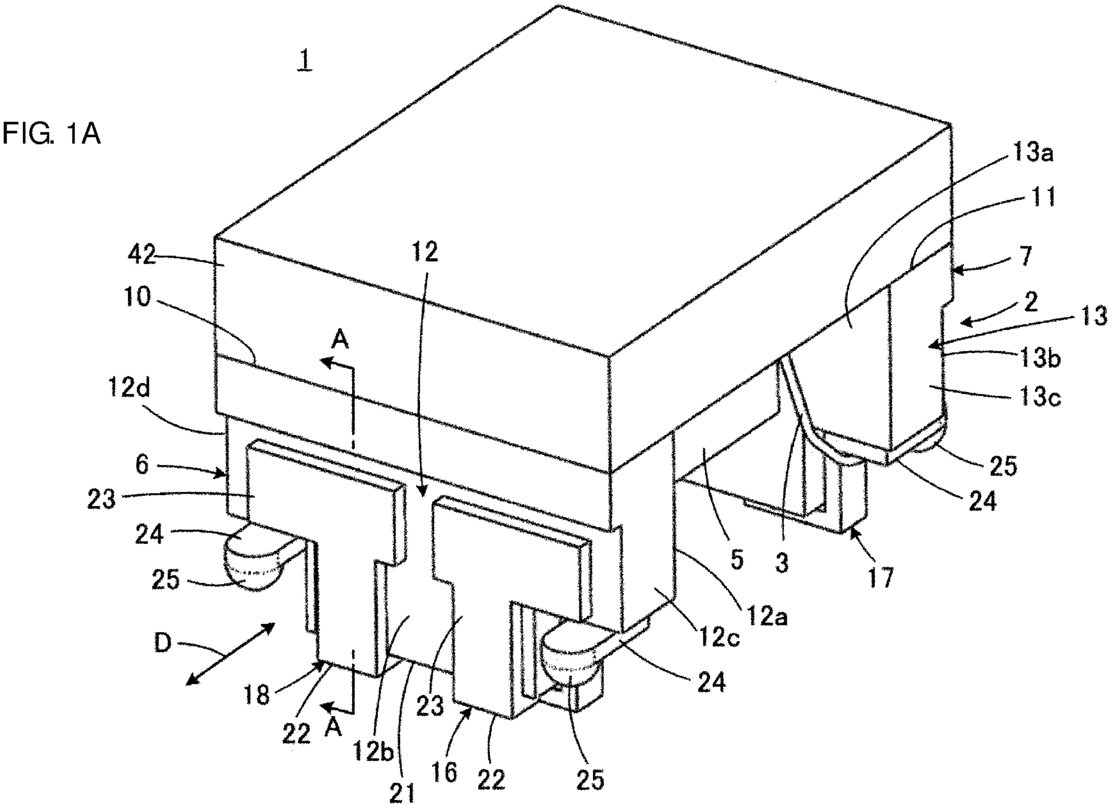
FIGS. 1A and 1B are external perspective views of a coil component according to a first embodiment of the disclosure, with FIG. 1A showing the coil component when viewed from a relatively high position and FIG. 1B showing the coil component when viewed from a relatively low position.
Figure 1B:
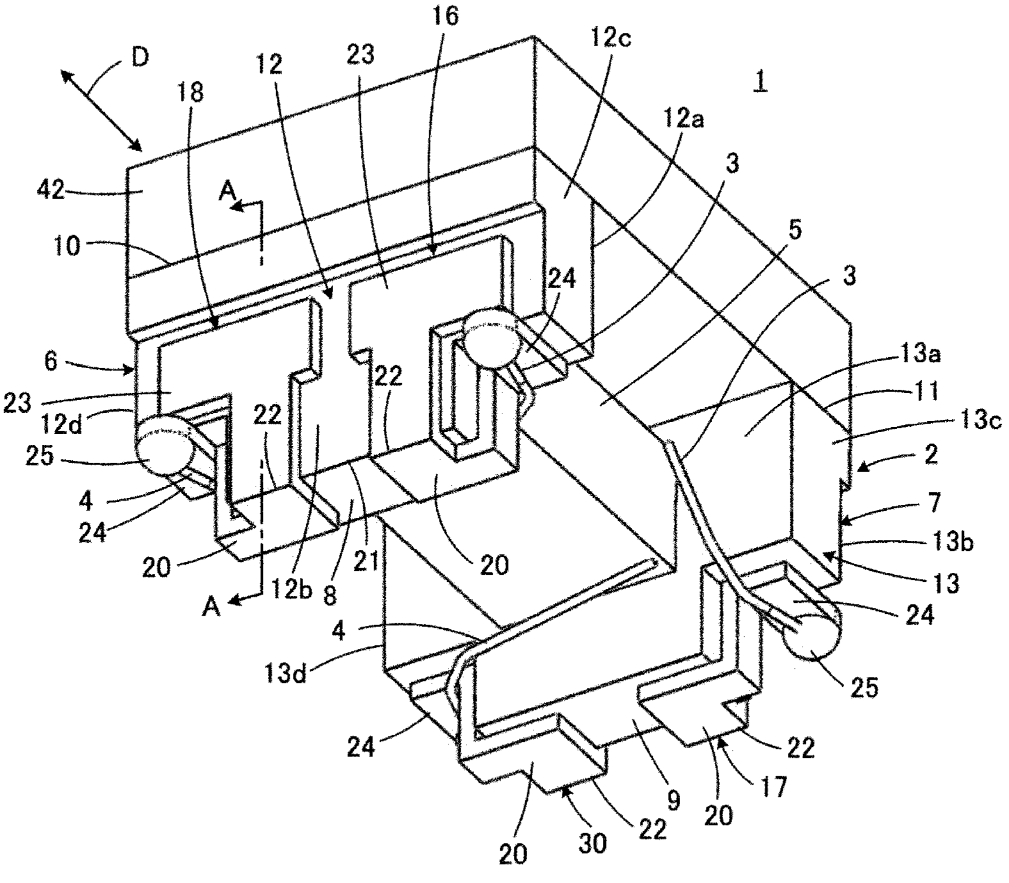

A coil component 1 according to a first embodiment of the disclosure is described with reference to FIGS. 1A and 1B and 2. The coil component 1 shown in FIGS. 1A and 1B constitutes, for example, a common-mode choke coil. FIGS. 1A and 1B do not show the main portions of two wires.

A drum-shaped core 2 that the coil component 1 includes is for arranging two wires, that is, a first wire 3 and a second wire 4, that are wound around the drum-shaped core 2. The drum-shaped core 2 includes a winding core section 5 that extends in an axial direction D, and a first flange portion 6 and a second flange portion 7 that are provided on a corresponding one of opposite end portions of the winding core section 5 in the axial direction D. The drum-shaped core 2 is desirably made of a ferrite. The drum-shaped core 2 may be made of, for example, a nonconductive material other than a ferrite, a nonmagnetic body such as alumina, or a resin containing ferrite powder or metal magnetic powder.

The winding core section 5, the first flange portion 6, and the second flange portion 7 that the drum-shaped core includes 2 has, for example, a substantially quadrangular prismatic shape having a substantially square cross section. An edge-line portion of the substantially quadrangular prismatic winding core section 5, an edge-line portion of the substantially quadrangular prismatic first flange portion 6, and an edge-line portion of the substantially quadrangular prismatic second flange portion 7 are desirably roundedly chamfered. Instead of a substantially square shape, the cross-sectional shape of each of the winding core section 5, the first flange portion 6, and the second flange portion 7 may be a substantially polygonal shape, such as a substantially hexagonal shape, or a substantially circular shape, or a substantially elliptical shape, or a combination of these shapes.

The first flange portion 6 includes a bottom surface 8 that is parallel to the axial direction D and that faces a mounting board when the first flange portion 6 is mounted, a top surface 10 that faces a direction opposite to the bottom surface 8, and a rising surface 12 that rises from the bottom surface 8. The rising surface 12 includes an inner end surface 12*a* that faces the winding core section 5, an outer end surface 12*b* that faces outward on a side opposite to the inner end surface 12*a*, and a first side surface 12*c* and a second side surface 12*d* that connect the inner end surface 12*a* and the outer end surface 12*b* to each other, each of the surfaces 12*a* to 12*d* extending in a direction orthogonal to the mounting board.

Similarly to the first flange portion 6, the second flange portion 7 includes a bottom surface 9 that is parallel to the axial direction D and that faces a mounting board when the second flange portion 7 is mounted, a top surface 11 that faces a direction opposite to the bottom surface 9, and a rising surface 13 that rises from the bottom surface 9. The rising surface 13 includes an inner end surface 13*a* that faces the winding core section 5, an outer end surface 13*b* that faces outward on a side opposite to the inner end surface 13*a*, and a first side surface 13*c* and a second side surface 13*d* that connect the inner end surface 13*a* and the outer end surface 13*b* to each other, each of the surfaces 13*a* to 13*d* extending in a direction orthogonal to the mounting board.

A protruding stepped portion along an upper side of the outer end surface 12*b* of the first flange portion 6 and a protruding stepped portion along an upper side of the outer end surface 13*b* of the second flange portion 7 are not essential features and need not be formed.

A first metal terminal 16 and a third metal terminal 18 are mounted on the first flange portion 6 so as to be disposed apart from each other. A second metal terminal 17 and a fourth metal terminal 19 are mounted on the second flange portion 7 so as to be disposed apart from each other.

Ordinarily, the metal terminals 16 to 19 are manufactured by processing, for example, a metal plate made of a copper-based alloy such as phosphor bronze or tough pitch copper. The metal plate, which is the material of the metal terminals 16 to 19, is desirably plated with zinc. The metal plate has a thickness of, for example, about 0.1 mm.

As shown in FIGS. 1A and 1B, the first metal terminal 16 and the third metal terminal 18 each include a seat portion 20 that covers the bottom surface 8 of the first flange portion 6, and a rising portion 23 that extends from the seat portion 20 via a bent portion 22, which covers an edge-line portion 21 where the bottom surface 8 and the outer end surface 12*b* of the first flange portion 6 intersect each other, to cover the rising surface 12 of the first flange portion 6. That is, the metal terminals 16 and 18 each further include the bent portion 22 that connects the seat portion 20 and the rising portion 23 to each other. In the embodiment, each rising portion 23 covers the outer end surface 12*b* of the first flange portion 6. The first metal terminal 16 and the third metal terminal 18 each further have a connecting portion 24 extending from the seat portion 20 formed thereat.

Although, in FIG. 1A and 1B, only a portion of the second metal terminal 17 and a portion of the fourth metal terminal 19 are shown, the first metal terminal 16 and the fourth metal terminal 19 have the same shape, and the second metal terminal 17 and the third metal terminal 18 have the same shape. Therefore, the reference numerals 20, 22, 23, and 24 used for denoting the seat portion, the bent portion, the rising portion, and the connecting portion of each of the first metal terminal 16 and the third metal terminal 18 are also used to denote corresponding portions of each of the second metal terminal 17 and the fourth metal terminal 19, as appropriate.

A first end of the first wire 3 is electrically connected to the connecting portion 24 at the first metal terminal 16. A second end of the first wire 3 opposite to the first end is electrically connected to the connecting portion 24 at the second metal terminal 17. A first end of the second wire 4 is electrically connected to the connecting portion 24 at the third metal terminal 18. A second end of the second wire 4 opposite to the first end is electrically connected to the connecting portion 24 at the fourth metal terminal 19. For example, welding is applied to these electrical connections. FIGS. 1A and 1B show welded bodies 25 that bulge with a substantially hemispherical shape formed by welding.

Ordinarily, the wires 3 and 4 are substantially circular in cross section, and each include a linear center conductor and an insulating film that covers a peripheral surface of the center conductor and that is made of an electrically insulating resin. The diameter of each of the wires 3 and 4 is, for example, about 40 μm. The diameter of each center conductor is, for example, about 30 μm. The thickness of each insulating film is, for example, about 10 μm. Each center conductor is made of a metal having good conductivity, such as copper, silver, or gold. Each insulating film is made of a resin, such as polyurethane or polyamide-imide.

Although not shown in FIGS. 1A and 1B, the first wire 3 and the second wire 4 are spirally wound in the same direction around the winding core section 5. More specifically, the first wire 3 and the second wire 4 may be wound in two layers with one of the first wire 3 and the second wire 4 being on an inner layer side and the other of the first wire 3 and the second wire 4 being on an outer layer side, or may be subjected to bifilar winding with each turn being alternately disposed and arranged side by side in the same direction in the axial direction of the winding core section 5.

The metal terminals 16 and 18 are each mounted on the first flange portion 6 with an adhesive, and the metal terminals 17 and 19 are each mounted on the second flange portion 7 with an adhesive. The details of these mounting portions are described below with reference to FIG. 2 that shows a cross section along line A-A in FIGS. 1A and 1B. FIG. 2 shows a mounting portion where the first metal terminal 16 is mounted on the first flange portion 6.

Figure 2:
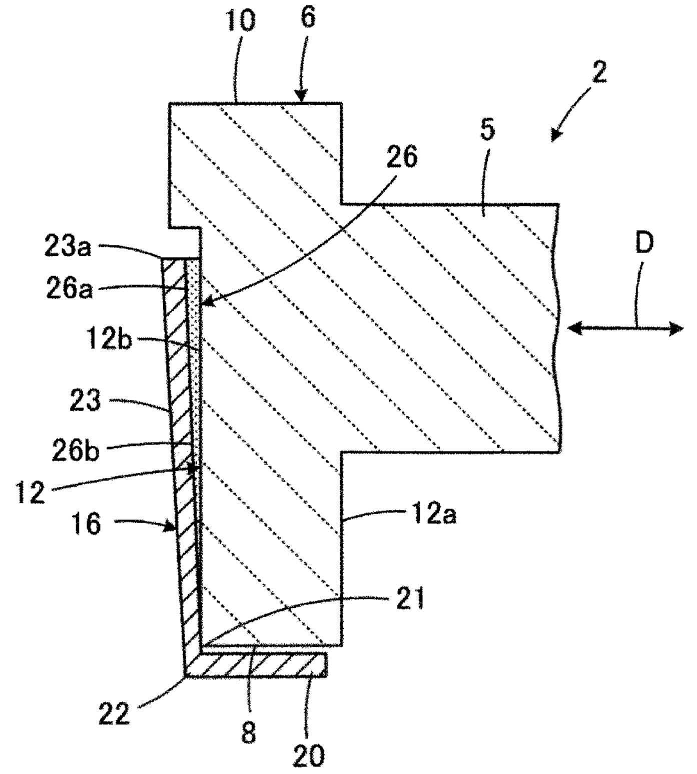
FIG. 2 is an enlarged sectional view along line A-A of FIGS. 1A and 1B and shows a mounting portion where a metal terminal is mounted on a flange portion of the coil component shown in FIGS. 1A and 1B.

As shown in FIG. 2, an adhesive layer 26, made of the aforementioned adhesive, is formed in contact with the rising portion 23 of the first metal terminal 16 and the rising surface 12 of the first flange portion 6, more specifically, the outer end surface 12*b*. The adhesive layer 26 includes a thick-walled portion 26*a* whose dimension in a thickness direction is relatively large and a thin-walled portion 26*b* whose dimension in the thickness direction is relatively small. The thick-walled portion 26*a* and the thin-walled portion 26*b* are arranged in a direction in which the bent portion 22 and an end 23*a* of the rising portion 23 are linked to each other.

In the embodiment, the adhesive layer 26 is formed such that the thick-walled portion 26*a* is farther from the bottom surface 8 and the thin-walled portion 26*b* is closer to the bottom surface 8. Such a structure, in particular, is advantageous to the phenomena below discovered by the inventors of this subject.

It has been found that, in existing coil components, the following phenomena occur, that is, the phenomenon in which cracks that cause peeling of an adhered portion due to a heat cycle in a state in which the coil components are soldered to a printed circuit board grow as the number of heat cycles is increased, and the phenomenon in which such cracks grow in a direction from an end side of the rising portion to the seat portion.

With regard to the above-described phenomenon in which cracks that cause peeling of an adhered portion due to a heat cycle in a state in which the coil components are soldered to a printed circuit board grow in a direction from the side of the end 23*a* of the rising portion 23 to the seat portion 20, according to the embodiment, since the thick-walled portion 26*a* whose dimension in the thickness direction is relatively large is positioned farther from the bottom surface 8, that is, is positioned on the side of the end 23*a* of the rising portion 23, stress that is exerted upon the adhesive layer 26 is dispersed at an initial stage at which cracks are on the verge of being formed. Therefore, it is possible to make it difficult for cracks to be formed and to grow in the adhesive layer 26.

The thin-walled portion 26*b* of the adhesive layer 26 whose dimension in the thickness direction is relatively small contributes to increasing adhesion strength. The thickness of the thin-walled portion 26*b* is equal to the thickness of the adhesive layer achieved due to ordinary pressing in existing structures, and is, thus, desirably less than about 4 μm. The minimum thickness of the thick-walled portion 26*a* is desirably about 4 μm or greater. By selecting the thickness of the adhesive layer 26 as described above, the effects provided by the thick-walled portion 26*a*, such as dispersion of stress, and the effects provided by the thin-walled portion 26*b*, such as an increase in adhesion strength, can both be more reliably realized. That the minimum thickness of the thick-walled portion 26*a* is desirably about 4 μm or greater also applies to the other embodiments.

In particular, in the embodiment, the bottom surface 8 and the outer end surface 12*b* of the first flange portion 6 are orthogonal to each other, and the rising portion 23 of the first metal terminal 16 has a substantially flat-plate shape. In such a structure, the angle between the seat portion 20 and the rising portion 23 of the first metal terminal 16 is an obtuse angle. As a result, the dimension of the adhesive layer 26 in the thickness direction is increased with increasing distance from the bottom surface 8. As in the embodiment, the thickness of the adhesive layer 26 may change continuously, and the boundary between the thick-walled portion 26*a* and the thin-walled portion 26*b* need not be clear. Even in this case, the thick-walled portion 26*a* and the thin-walled portion 26*b* each function satisfactorily as described above.

Although FIG. 2 does not show, for example, an adhesive between the bottom surface 8 of the first flange portion 6 and the seat portion 20 of the first metal terminal 16, an adhesive may be applied here. This also applies to the other embodiments described below.

In order to acquire the structure shown in FIG. 2, ordinarily, as the first metal terminal 16 prior to an adhesion step, a metal terminal in which the angle between the seat portion 20 and the rising portion 23 is an obtuse angle is provided. With the first metal terminal 16 positioned with respect to the drum-shaped core 2, an adhesive applied to a predetermined region, and the angle between the seat portion 20 and the rising portion 23 being maintained as an obtuse angle, the adhesive is solidified.

Hitherto, since a thin adhesive layer having a uniform thickness has been formed to realize a firmly adhered state, in the adhesion step, the rising portion of the metal terminal has been pushed towards the outer end surface of the flange portion and, with this state maintained, the adhesive has been solidified. However, in the embodiment, even if the rising portion 23 of the first metal terminal 16 is pushed towards the outer end surface 12*b* of the first flange portion 6, the state in which the angle between the seat portion 20 and the rising portion 23 is an obtuse angle is maintained. Therefore, for example, the pushing is allowed as long as only the bottom-surface-8 side of the rising portion 23 is pushed.

As the adhesive that forms the adhesive layer 26, for example, an epoxy-based adhesive is used. In this case, the epoxy-based adhesive may contain a filler, such as silicone particles or barium-sulfate particles.

As shown in FIGS. 1A and 1B, the coil component 1 may further include a plate-shaped core 42 that bridges the top surface 10 of the first flange portion 6 and the top surface 11 of the second flange portion 7. Similarly to the drum-shaped core 2, the plate-shaped core 42 is desirably made of a ferrite. The plate-shaped core 42 may be made of, for example, a nonconductive material other than a ferrite, a nonmagnetic body such as alumina, or a resin containing ferrite powder or metal magnetic powder.

The plate-shaped core 42 is adhered to the top surface 10 of the first flange portion 6 and the top surface 11 of the second flange portion 7 with an adhesive (not shown). Therefore, the plate-shaped core 42 can form a closed magnetic path in cooperation with the drum-shaped core 2. As the adhesive, for example, an adhesive made of an epoxy resin containing a silica filler is used. In order to narrow a gap between the plate-shaped core 42 and each of the first flange portion 6 and the second flange portion 7, an adhesive that does not contain a filler may be used.

Other embodiments of the disclosure are described below with reference to FIGS. 3 to 10. In FIGS. 3 to 10, elements corresponding to the elements shown in FIG. 2 are given the same reference numerals and the same descriptions are not repeated.

Figure 3:
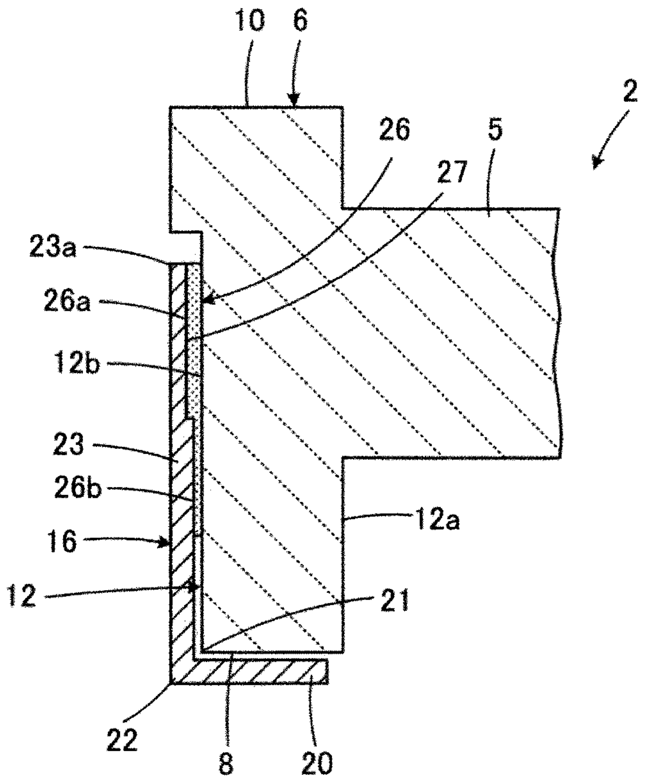
FIG. 3 is an enlarged sectional view that is for describing a second embodiment of the disclosure and that corresponds to FIG. 2.

In a second embodiment shown in FIG. 3, a recessed portion 27 is formed in a portion of a surface of a rising portion 23 of a first metal terminal 16 that contacts an adhesive layer 26, more specifically, on a side of an end 23*a* of the rising portion 23 at the surface that contacts the adhesive layer 26. Therefore, a thick-walled portion 26*a* of the adhesive layer 26 is formed at the recessed portion 27, and a thin-walled portion 26*b* of the adhesive layer 26 is formed at a portion other than the recessed portion 27. In this way, when the recessed portion 27 exists, it is possible to easily form the thick-walled portion 26*a* and the thin-walled portion 26*b*.

The recessed portion 27 can be formed in the rising portion 23, for example, by a coining process in which a portion of the rising portion 23 is caused to be thin-walled.

Figure 4:
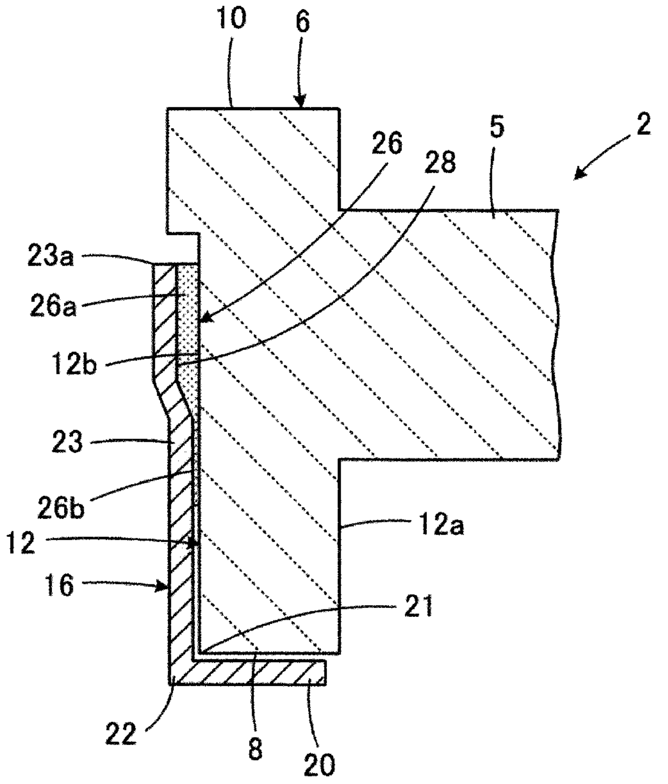
FIG. 4 is an enlarged sectional view that is for describing a third embodiment of the disclosure and that corresponds to FIG. 2.

In a third embodiment shown in FIG. 4, as in the second embodiment shown in FIG. 3, a recessed portion 28 is formed in a portion of a surface of a rising portion 23 of a first metal terminal 16 that contacts an adhesive layer 26, more specifically, on a side of an end 23*a* of the rising portion 23 at the surface that contacts the adhesive layer 26. Therefore, a thick-walled portion 26*a* of the adhesive layer 26 is formed at the recessed portion 28, and a thin-walled portion 26*b* of the adhesive layer 26 is formed at a portion other than the recessed portion 28. Even in this embodiment, since the recessed portion 28 exists, it is possible to easily form the thick-walled portion 26*a* and the thin-walled portion 26*b*.

The recessed portion 28 can be formed in the rising portion 23, for example, by an embossing process in which a portion of the rising portion 23 is pushed out.

The second embodiment shown in FIG. 3 and the third embodiment shown in FIG. 4 can provide operational effects that are similar to those provided by the first embodiment shown in FIG. 2.

Figure 5:
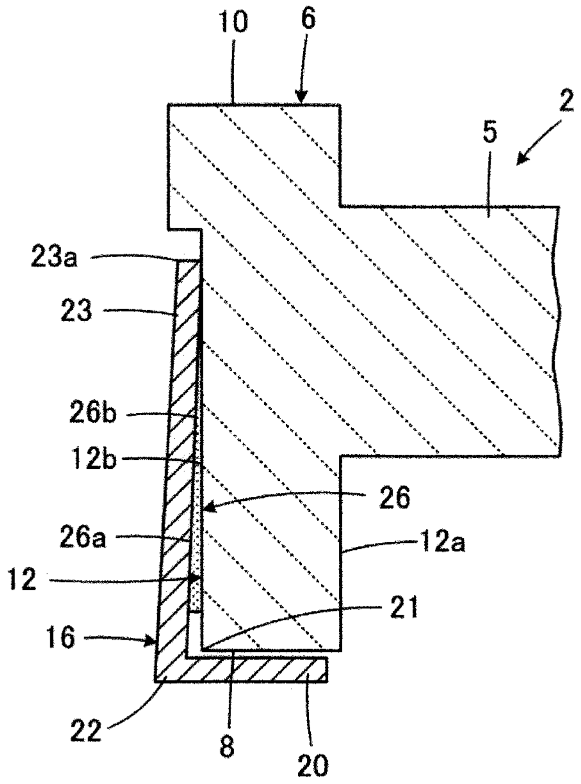
FIG. 5 is an enlarged sectional view that is for describing a fourth embodiment of the disclosure and that corresponds to FIG. 2.

In a fourth embodiment shown in FIG. 5, the positional relationship between a thick-walled portion 26*a* and a thin-walled portion 26*b* of an adhesive layer 26 is opposite to the positional relationship in the first embodiment. The adhesive layer 26 is formed such that the thin-walled portion 26*b* is farther from a bottom surface 8 and the thick-walled portion 26*a* is closer to the bottom surface 8. With regard to the above-described phenomenon in which cracks that cause peeling of an adhered portion due to a heat cycle in a state in which a coil component is soldered to a printed circuit board grow in a direction from the side of the end 23*a* of the rising portion 23 to a seat portion 20, according to the embodiment, since the thick-walled portion 26*a* whose dimension in a thickness direction is relatively large is positioned closer to the bottom surface 8, stress that is exerted upon the adhesive layer 26 is advantageously dispersed at a final stage at which the growth of the cracks ends. Therefore, it is possible to prevent the cracks from completely growing in the adhesive layer 26 and, thus, to prevent the adhesive strength from becoming zero.

The thin-walled portion 26*b* of the adhesive layer 26 whose dimension in the thickness direction is relatively small contributes to increasing adhesion strength.

In particular, in the fourth embodiment, as in the first embodiment, the bottom surface 8 and an outer end surface 12*b* of a first flange portion 6 are orthogonal to each other, and the rising portion 23 of a first metal terminal 16 has a substantially flat-plate shape. In such a structure, the angle between the seat portion 20 and the rising portion 23 of the first metal terminal 16 is an acute angle. As a result, the dimension of the adhesive layer 26 in the thickness direction is increased with decreasing distance from the bottom surface 8. Therefore, even in the embodiment, as in the first embodiment, the thickness of the adhesive layer 26 may change continuously, and the boundary between the thick-walled portion 26*a* and the thin-walled portion 26*b* need not be clear. Even in this case, the thick-walled portion 26*a* and the thin-walled portion 26*b* each function satisfactorily as described above.

In order to acquire the structure shown in FIG. 5, ordinarily, as the first metal terminal 16 prior to an adhesion step, a metal terminal in which the angle between the seat portion 20 and the rising portion 23 is an acute angle is provided. With the first metal terminal 16 positioned with respect to a drum-shaped core 2, an adhesive applied to a predetermined region, and the angle between the seat portion 20 and the rising portion 23 being maintained as an acute angle, the adhesive is solidified. That is, even if, in the adhesion step, the rising portion 23 of the first metal terminal 16 is pushed towards the outer end surface 12*b* of the first flange portion 6, the state in which the angle between the seat portion 20 and the rising portion 23 is an acute angle is maintained. Therefore, for example, the pushing is allowed as long as only the end 23*a* of the rising portion 23 is pushed.

Figure 6:
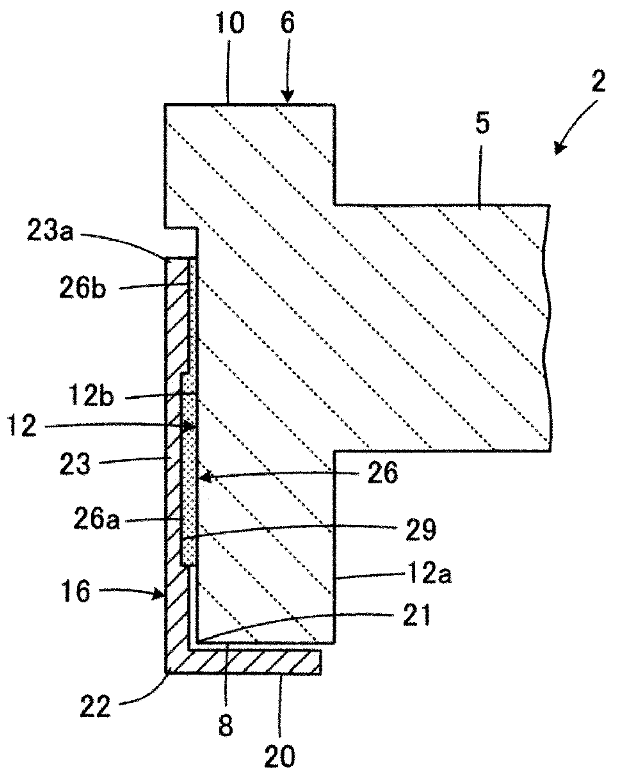
FIG. 6 is an enlarged sectional view that is for describing a fifth embodiment of the disclosure and that corresponds to FIG. 2.

In a fifth embodiment shown in FIG. 6, a recessed portion 29 is formed in a portion of a surface of a rising portion 23 of a first metal terminal 16 that contacts an adhesive layer 26, more specifically, on a bottom-surface-8 side of the rising portion 23 at the surface that contacts the adhesive layer 26. Therefore, a thick-walled portion 26*a* of the adhesive layer 26 is formed at the recessed portion 29, and a thin-walled portion 26*b* of the adhesive layer 26 is formed at a portion other than the recessed portion 29. Even in this embodiment, since the recessed portion 29 exists, it is possible to easily form the thick-walled portion 26*a* and the thin-walled portion 26*b*. A sixth embodiment to a ninth embodiment shown in FIGS. 7 to 10 provide similar effects.

The recessed portion 29 can be formed in the rising portion 23, for example, by a coining process in which a portion of the rising portion 23 is caused to be thin-walled.

Figure 7:
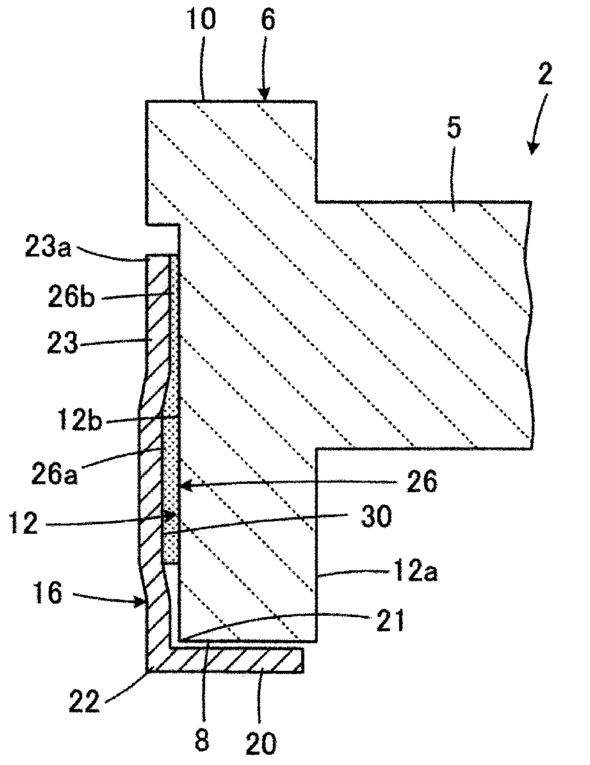
FIG. 7 is an enlarged sectional view that is for describing a sixth embodiment of the disclosure and that corresponds to FIG. 2.

In a sixth embodiment shown in FIG. 7, as in the fifth embodiment shown in FIG. 6, a recessed portion 30 is formed in a portion of a surface of a rising portion 23 of a first metal terminal 16 that contacts an adhesive layer 26, more specifically, on a bottom-surface-8 side of the surface that contacts the adhesive layer 26. Therefore, a thick-walled portion 26*a* of the adhesive layer 26 is formed at the recessed portion 30, and a thin-walled portion 26*b* of the adhesive layer 26 is formed at a portion other than the recessed portion 30.

The recessed portion 30 can be formed in the rising portion 23, for example, by an embossing process in which a portion of the rising portion 23 is pushed out.

The fifth embodiment shown in FIG. 6 and the sixth embodiment shown in FIG. 7 can provide operational effects that are similar to those provided by the fourth embodiment shown in FIG. 5.

Figure 8:
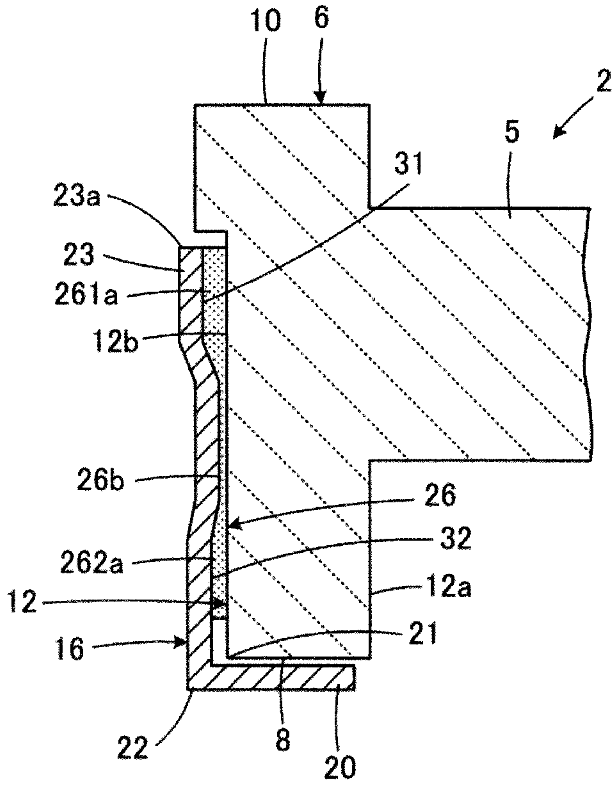
FIG. 8 is an enlarged sectional view that is for describing a seventh embodiment of the disclosure and that corresponds to FIG. 2.

In a seventh embodiment shown in FIG. 8, a first recessed portion 31 and a second recessed portion 32 are formed in portions of a surface of a rising portion 23 of a first metal terminal 16 that contacts an adhesive layer 26, more specifically, the first recessed portion 31 is formed on a side of an end 23*a* of the rising portion 23 at the surface that contacts the adhesive layer 26, and the second recessed portion 32 is formed on a bottom-surface-8 side of the rising portion 23 at the surface that contacts the adhesive layer 26. Therefore, a first thick-walled portion 261*a* and a second thick-walled portion 262*a* of the adhesive layer 26 are formed at the first recessed portion 31 and the second recessed portion 32, respectively, and a thin-walled portion 26*b* of the adhesive layer 26 is formed at a portion other than the recessed portions 31 and 32, that is, at a portion interposed between the first recessed portion 31 and the second recessed portion 32.

The recessed portions 31 and 32 can be formed in the rising portion 23, for example, by an embossing process in which portions of the rising portion 23 are pushed out.

In the seventh embodiment shown in FIG. 8, the first thick-walled portion 261*a* and the second thick-walled portion 262*a* whose dimensions in a thickness direction are relatively large are positioned closer to the side of the end 23*a* of the rising portion 23 and to the side of the bottom surface 8, respectively. Therefore, the seventh embodiment can provide both the operational effects provided by the first embodiment to the third embodiment and the operational effects provided by the fourth embodiment to the sixth embodiment.

More specifically, with regard to the above-described phenomenon in which cracks that cause peeling of an adhered portion due to a heat cycle in a state in which a coil component is soldered to a printed circuit board grow in a direction from the side of the end 23*a* of the rising portion 23 to the bottom surface 8, first, the first thick-walled portion 261*a* that is defined by the first recessed portion 31 on the side of the end 23*a* of the rising portion 23 advantageously disperses stress that is exerted upon the adhesive layer 26 at an initial stage at which cracks are on the verge of being formed. Therefore, it is possible to prevent the cracks from completely growing in the adhesive layer 26 and, thus, to make it difficult for the cracks to grow. Next, the second thick-walled portion 262*a* that is defined by the second recessed portion 32 of the rising portion 23 that is closer to the bottom surface 8 advantageously disperses stress that is exerted upon the adhesive layer 26 at a final stage at which the growth of the cracks ends. Therefore, it is possible to prevent the cracks from completely growing in the adhesive layer 26, and, thus, to prevent the adhesion strength from becoming zero.

The thin-walled portion 26*b* of the adhesive layer 26 whose dimension in a thickness direction is relatively small contributes to increasing adhesion strength.

Figure 9:
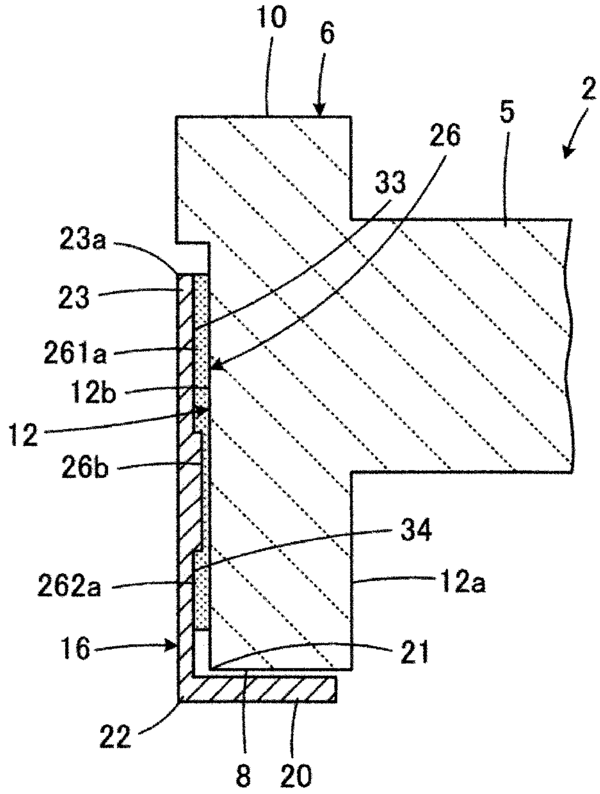
FIG. 9 is an enlarged sectional view that is for describing an eighth embodiment of the disclosure and that corresponds to FIG. 2.

In an eighth embodiment shown in FIG. 9, as in the seventh embodiment shown in FIG. 8, a first recessed portion 33 and a second recessed portion 34 are formed in portions of a surface of a rising portion 23 of a first metal terminal 16 that contacts an adhesive layer 26, more specifically, the first recessed portion 33 is formed on a side of an end 23*a* of the rising portion 23 at the surface that contacts the adhesive layer 26, and the second recessed portion 34 is formed on a bottom-surface-8 side of the rising portion 23 at the surface that contacts the adhesive layer 26. Therefore, a first thick-walled portion 261*a* and a second thick-walled portion 262*a* of the adhesive layer 26 are formed at the first recessed portion 33 and the second recessed portion 34, respectively, and a thin-walled portion 26*b* of the adhesive layer 26 is formed at a portion other than the recessed portions 33 and 34, that is, at a portion interposed between the first recessed portion 33 and the second recessed portion 34.

The recessed portions 33 and 34 can be formed in the rising portion 23, for example, by a coining process in which a portion of the rising portion 23 is caused to be thin-walled.

The eighth embodiment shown in FIG. 9 can provide operational effects that are similar to those provided by the seventh embodiment shown in FIG. 8.

Figure 10:
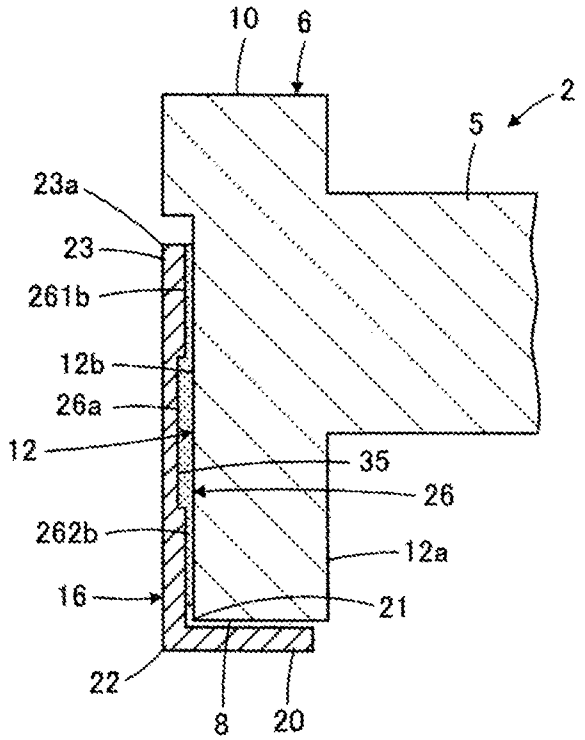
FIG. 10 is an enlarged sectional view that is for describing a ninth embodiment of the disclosure and that corresponds to FIG. 2.
Figure 11:
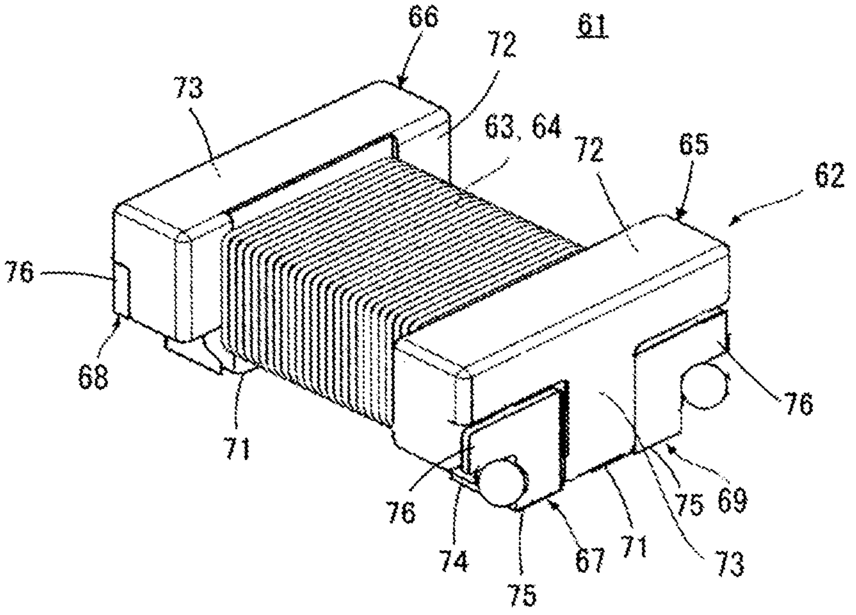
FIG. 11 PRIOR ART
FIG. 11 is an external perspective view of a coil component described in Japanese Unexamined Patent Application Publication No. 2015-35473.

In a ninth embodiment shown in FIG. 10, a recessed portion 35 is formed in a portion of a surface of a rising portion 23 of a first metal terminal 16 that contacts an adhesive layer 26, more specifically, at an intermediate position between an end-23*a* portion and a bent portion 22 of the rising portion 23. Therefore, the thick-walled portion 26*a* is positioned at the recessed portion 35, and thin-walled portions 261*b* and 262*b* are positioned at portions other than the recessed portion 35, that is, on the upper side and the lower side of the thick-walled portion 26*a* that is positioned at the recessed portion 35. The intermediate position between the end-23*a* portion and the bent portion 22 of the rising portion 23 is not limited to a midpoint position between the end-23*a* portion and the bent portion 22 of the rising portion 23, and, thus, may be on a top-surface-10 side or a bottom-surface-8 side of the midpoint position by a certain degree.

The recessed portion 35 can be formed in the rising portion 23, for example, by a coining process in which a portion of the rising portion 23 is caused to be thin-walled. The recessed portion 35 may be formed by an embossing process.

Regarding the structures in the ninth embodiment shown in FIG. 10, the structure including the thick-walled portion 26*a* at the intermediate position of the adhesive layer 26 and the thin-walled portion 261*b* on the side of the end 23*a* of the rising portion 23 corresponds to the structure including the thick-walled portion 26*a* and the thin-walled portion 26*b* of the adhesive layer 26 shown in FIG. 6. The structure including the thick-walled portion 26*a* at the intermediate position of the adhesive layer 26 and the thin-walled portion 262*b* on the side of the bent portion 22 corresponds to the structure including the thick-walled portion 26*a* and the thin-walled portion 26*b* of the adhesive layer 26 shown in FIG. 3.

Therefore, the ninth embodiment shown in FIG. 10 can provide both the operational effects provided by the fifth embodiment shown in FIG. 6 and the operational effects provided by the second embodiment shown in FIG. 3. In other words, the ninth embodiment shown in FIG. 10 can provide operational effects similar to the operational effects provided by the seventh embodiment shown in FIG. 8 and the operational effects provided by the eighth embodiment shown in FIG. 9.

Although, in the descriptions of the first embodiment to the ninth embodiment with reference to FIG. 2 to FIG. 10 above, the mounting portion where the first metal terminal 16 is mounted on the first flange portion 6 of the coil component 1 has been described, the structure of this mounting portion may or may not be applied to a mounting portion where the third metal terminal 18 is mounted on the first flange portion 6, a mounting portion where the second metal terminal 17 is mounted on the second flange portion 7, and a mounting portion where the fourth metal terminal 19 is mounted on the second flange portion 7. In addition, the shapes of the mounting portion of the first metal terminal 16 to the mounting portion of the fourth metal terminal 19 may differ from each other, or the structures of the first embodiment to the ninth embodiment may be appropriately combined.

Although the coil component according to the disclosure has been described on the basis of embodiments regarding a more specific common-mode choke coil, the embodiments are illustrative, and various modifications are possible.

For example, although, in the illustrated embodiments, the thick-walled portion and the thin-walled portion are formed in accordance with the shape of the metal terminal, the thick-walled portion and the thin-walled portion of the adhesive layer may be formed in accordance with an inclined shape or a recessed shape of the flange portion. Further, the thick-walled portion and the thin-walled portion of the adhesive layer may be formed by combining the shapes of both the metal terminal and the flange portion.

The rising portion of the metal terminal is essentially provided so as to cover the rising surface of the flange portion that rises from the bottom surface of the flange portion. Therefore, the rising portion of the metal terminal is not limited to one that covers the outer end surface of the flange portion, and may be one that covers a side surface of the flange portion.

For example, the number of wires and the wire winding direction of the coil component, and the number of metal terminals are changeable in accordance with the function of the coil component.

The embodiments described in the present specification are illustrative, and structures of different embodiments may be partly replaced or combined.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a drum-shaped core that includes a winding core section that extends in an axial direction, and a flange portion that is provided on an end portion in the axial direction, the flange portion including a bottom surface that is parallel to the axial direction and that faces a mounting board when the flange portion is mounted, and a rising surface that rises from the bottom surface;

a wire that is wound around the winding core section;

a metal terminal that is electrically connected to an end portion of the wire, that is mounted on the flange portion, and that is formed from a metal plate, the metal terminal including a seat portion that covers the bottom surface and a rising portion that covers the rising surface; and an adhesive layer that contacts both the rising portion and the rising surface, the adhesive layer including a thick-walled portion and a thin-walled portion having different thicknesses, wherein the thin-walled portion is closer than the thick-walled portion to the bottom surface.

2. The coil component according to claim 1, wherein a thickness of the adhesive layer increases with increasing distance from the bottom surface.

3. The coil component according to claim 2, wherein the metal terminal further includes a bent portion that connects the seat portion and the rising portion to each other.

4. The coil component according to claim 2, wherein the rising portion is inclined with respect to the rising surface.

5. The coil component according to claim 1, wherein the metal terminal further includes a bent portion that connects the seat portion and the rising portion to each other.

6. The coil component according to claim 1, wherein the rising portion is inclined with respect to the rising surface.

7. The coil component according to claim 6, wherein an angle between the seat portion and the rising portion is an obtuse angle.

8. The coil component according to claim 1, wherein the flange portion includes an outer end surface that faces outward on a side opposite to a side of the winding core section, and the outer end surface is the rising surface.

9. The coil component according to claim 1, wherein a thickness of the thick-walled portion is about 4 μm or greater, and a thickness of the thin-walled portion is less than about 4 μm.

10. A coil component comprising:

a drum-shaped core that includes a winding core section that extends in an axial direction, and a flange portion that is provided on an end portion in the axial direction, the flange portion including
   a bottom surface that is parallel to the axial direction and that faces a mounting board when the flange portion is mounted, and
   a rising surface that rises from the bottom surface;
a wire that is wound around the winding core section;
a metal terminal that is electrically connected to an end portion of the wire, that is mounted on the flange portion, and that is formed from a metal plate, the metal terminal including a seat portion that covers the bottom surface and a rising portion that covers the rising surface, and the rising portion being T-shaped; and
an adhesive layer that contacts both the rising portion and the rising surface, the adhesive layer including a thick-walled portion and a thin-walled portion having different thicknesses.

* * * * *